(12) United States Patent
Addiego et al.

(10) Patent No.: US 6,916,943 B2
(45) Date of Patent: Jul. 12, 2005

(54) SUPPORTED METAL CATALYSTS

(75) Inventors: William P. Addiego, Big Flats, NY (US); Christopher R. Glose, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 198 days.

(21) Appl. No.: 10/320,260

(22) Filed: Dec. 16, 2002

(65) Prior Publication Data

US 2004/0116279 A1 Jun. 17, 2004

(51) Int. Cl.$^7$ ............................................... C07C 51/36
(52) U.S. Cl. ...................................................... 554/141
(58) Field of Search ......................................... 554/141

(56) References Cited

U.S. PATENT DOCUMENTS

| | | | |
|---|---|---|---|
| 3,873,469 A | 3/1975 | Foster et al. | |
| 4,163,750 A | 8/1979 | Bird et al. | |
| 4,524,225 A | 6/1985 | Qualeatti et al. | |
| 4,631,267 A | 12/1986 | Lachman et al. | |
| 5,225,581 A | * 7/1993 | Pintauro | ..................... 554/147 |
| 5,356,847 A | 10/1994 | Henderson | |
| 5,820,967 A | 10/1998 | Gadkaree | |
| 6,207,098 B1 | 3/2001 | Nakanishi et al. | |
| 6,407,033 B1 | 6/2002 | Kimura et al. | |
| 6,548,149 B1 | 4/2003 | Liu et al. | |
| 6,620,749 B2 | 9/2003 | Hsu et al. | |

* cited by examiner

Primary Examiner—Elizabeth D. Wood
(74) Attorney, Agent, or Firm—Kees van der Sterre

(57) ABSTRACT

A process of making a supported catalyst includes steps of preparing a washcoat containing a mixture of hydrolyzed silicon alkoxide and a filler, depositing the washcoat on a surface of a solid support, drying the washcoat deposited on the surface of the solid support to form a coating on the surface of the solid support, and distributing a metal catalyst on the coating. The resulting supported catalyst may be used in a reaction vessel, such as a fixed bed reactor, for effecting a catalytic reaction, such as catalytic hydrogenation of an edible oil. The washcoatings can be formulated to provide a viscous composition that can be applied to form a thick coating on a substrate. The dried washcoatings exhibit excellent stability, cohesive layering strength, and adhesive strength between the coating and a substrate.

3 Claims, 2 Drawing Sheets

SUPPORTED METAL CATALYSTS

BACKGROUND OF THE INVENTION

The present invention relates to supported metal catalysts and more particularly to high surface areas coatings which are deposited on a solid support and onto which a metal catalyst is dispersed.

Conventional catalyst supports for fixed bed reactors and the like have comprised a support substrate having a relatively low surface area, such as a ceramic substrate, onto which is deposited a coating having a relatively high surface area. The coating increases the available area upon which the metal catalyst may be dispersed, and therefore increases the volume and mass specific activities of the supported catalyst. In many cases this increased activity is critical to achieving a commercially viable reaction process.

A problem with conventional coatings (hereinafter referred to as "washcoats") is that they can have a tendency to flake off during use due to flow of fluids through the reactor bed. This flaking can be particularly pronounced in processes in which the supported catalysts are subjected to thermal cycling, due to the difference between the thermal coefficient of expansion of the substrate and the coating. This effect can be reduced by using a silica-based washcoat with a ceramic, silica, alumina, alumina-silica, or other substrate having a thermal coefficient of expansion that is matched to the silica-based washcoat. However, it is difficult to form thick coatings on substrates using conventional silica washcoats. It has also been difficult to achieve sufficient cohesive strength between successively applied coatings and sufficient adhesive strength between the coating and the substrate to withstand the effects of fluids flowing around the supported catalysts using these conventional silica washcoats.

Supported metal catalysts are used in a variety of catalytic processes, including alkylation, ammination, oxidation, hydroformylation, and others. A particular application for supported metal catalysts requiring a catalyst of high durability is in the hydrogenation of edible animal and vegetable oils. Edible oils consist essentially of triglycerides with smaller proportions of mono- and di-glycerides, i.e., esters of the trihydric alcohol glycerol with long chain fatty acids. Triglycerides are represented by the general formula $CH_2R_1$—$CHR_2$—$CH_2R_3$, where $R_1$, $R_2$ and $R_3$ are the same or different long chain fatty acids. These long chain fatty acid moieties generally contain 3, 2, 1 or 0 carbon-carbon double bonds. In order to increase the storage, oxidative and thermal stability of edible oils, the number of unsaturated carbon-carbon double bonds in the fatty acid moieties is decreased by catalytic hydrogenation. It is most desirable to eliminate or substantially reduce the concentration of fatty acid moieties having three carbon-carbon double bonds (e.g., linolenates), while avoiding hydrogenation of fatty acid moieties having two or one carbon-carbon double bonds (linoleinates and oleinates, respectively). Further, it is desirable that cis-trans isomerization of linolenates and other fatty acid moieties having two double bonds be avoided during the reaction process.

Hydrogenation of edible oils can be accomplished either in a slurry phase with a powder catalyst or in a fixed bed with a formed catalyst. The normal catalyst of choice utilizes reduced nickel as the catalytic species. However, nickel, and especially any nickel oxide, nickel hydroxide, or nickel carbonate present in the catalyst tends to react with the fatty acids to form nickel soaps. These soaps can redeposit on the catalyst or can be removed from the catalyst and accumulate in the slurry phase or can be carried off in the fatty acid liquid in a fixed bed reaction. As the amount of soap deposited on the catalyst increases, the activity of the catalyst decreases. In addition, any dissolved nickel soaps which are carried into the product can be deleterious to the quality of the product. Further, nickel catalysts are inherently toxic.

Some of the problems encountered in the hydrogenation of edible oils can be addressed through the use of structured catalysts, i.e., catalysts provided as monolithic structures comprising through-channels or other open internal void spaces bounded by internal surfaces composed of or supporting a catalyst, through which oils to be processed may flow. However, conventional structured catalysts, particularly structured catalysts provided with washcoats for supported metal catalysts, do not exhibit sufficient cohesive layering on the substrate and/or adhesion to the substrate to survive commercial processing conditions. Thus a need remains for processes for the catalytic hydrogenation of edible oils based on the use of durable structured catalysts for carrying out the hydrogenation process.

SUMMARY OF THE INVENTION

The present invention provides structured catalysts for fixed bed reactors that incorporate surface layers of improved durability yet excellent chemical compatibility with known metal hydrogenation catalysts. The durable surface layers on these structured catalysts may consist of partially oxidized activated carbon surfaces for supporting the metal catalysts, or cohesive and adherent catalyst support washcoats containing the dried product of a hydrolyzed silicon alkoxide and a filler.

In one aspect, then, the invention provides washcoatings for supported metal catalysts which exhibit improved coating properties. In particular, the washcoatings of this invention can be formulated to provide a viscous composition that can be applied to form a thick coating on a substrate. Further, the dried washcoatings of this invention exhibit excellent stability, excellent cohesive layering strength, and excellent adhesive strength between the coating and the substrate.

In accordance with another aspect of the invention, a process of making a supported catalyst comprises preparing a washcoat containing a mixture of hydrolyzed silicon alkoxide and a filler, depositing the washcoat on a surface of a solid support, drying the washcoat deposited on the surface of the solid support to form a coating on the surface of the solid support, and distributing a metal catalyst on the coating.

In yet another aspect of the invention, the supported metal catalyst is contacted with an edible oil and hydrogen under appropriate conditions to achieve catalytic hydrogenation of the edible oil. The invention additionally provides fixed bed reactors comprising a structured catalysts having durable surface layers wherein the supported active metal catalyst is provided.

In accordance with another aspect of the invention, there is provided a method of forming a structured catalyst comprising providing a shaped carbon support, oxidizing a surface of the carbon support to provide ion exchange sites on the surface of the carbon support, and distributing a metal catalyst on the oxidized surface of the carbon support. Other related aspects of this invention include the resulting supported catalyst having a metal catalyst distributed on an oxidized surface of a carbon support, the use of this supported catalyst in a process for catalytically hydrogenating edible oil, and a fixed bed reactor utilizing this supported catalyst.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

DETAILED DESCRIPTION

Figure 1:
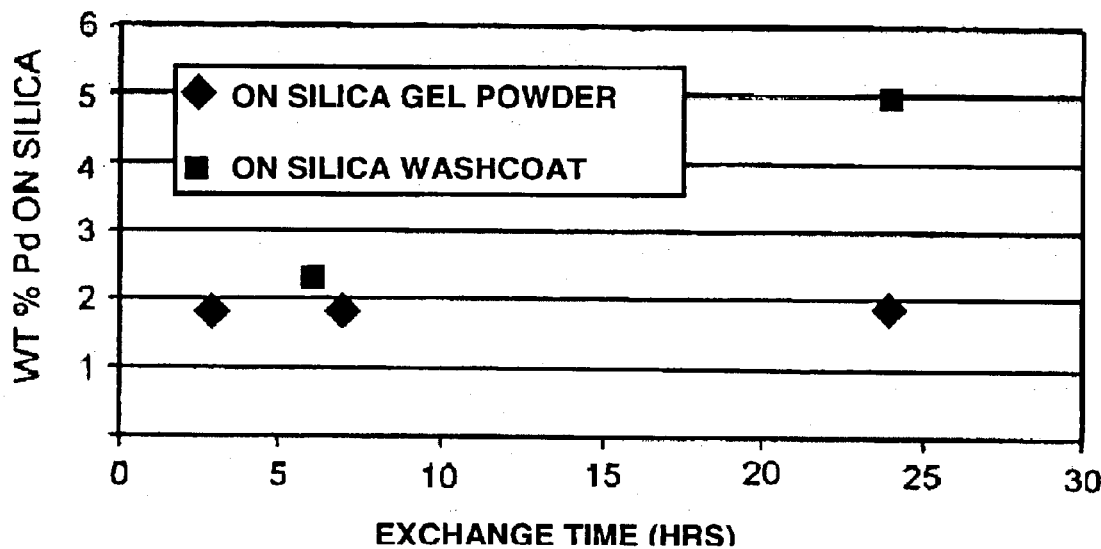
FIG. 1 is a graph showing the amount of palladium on a silica gel powder and silica washcoat, as a function of ion exchange time.

It has been discovered that a washcoat slurry comprising hydrolyzed silicon alkoxide and an appropriate amount of filler provides thick, stable washcoats with excellent cohesive layering properties and excellent adhesion with various substrates.

The washcoat may be prepared by combining a metal alkoxide with a suitable acid and water to yield from about 70% to about 90% hydrolysis according to the formula:

$$Si(OC_2H_5)_4 + 2XH_2O \rightarrow [Si(OC_2H_5)_{4(l-x)}(O)_{2x}] + 4XC_2H_5OH.$$

Examples of suitable silicon alkoxides include tetramethyl orthosilicate, tetraethyl orthosilicate, and the like. Other alkoxides of silicon and/or aluminum may be used. Further, silicon compounds commonly referred to as coupling agents, e.g., aminopropyltrimethoxysilane may be employed in the washcoat. Suitable acids to effect the desired hydrolysis include hydrochloric acid, as well as other organic and/or inorganic acids.

After the acidified water phase disappears, indicating that hydrolysis has been completed, a filler is added to the hydrolyzed metal alkoxide solution. A preferred filler is silicon dioxide (e.g., fused silica, silica gel, fumed silica, calcined or uncalcined silicic acid, etc.). The metal alkoxide, acid, water and filler are combined in proportions that provide a viscous slurry containing from about 50% to about 70% filler (e.g., silica) by weight, based on total solids in the slurry. Total solids in the coating slurry may range from about 10 to about 70 percent by weight, although higher or lower total solids content may be employed. The fillers used typically have an average particle size of from about 5 microns to about 200 microns. However, larger or smaller particles may be used.

Examples of fillers, other than silica, that may be employed include clays, zeolites, talc, carbonates such as calcium carbonate, aluminosilicates such as kaolin, fly ash, silicates such as wollastonite (calcium metasilicate), titanates, zirconates, zirconia, zirconia spinel, magnesium aluminum silicates, mullite, alumina, alumina trihydrate, spinel, feldspar, attapulgites, cordierite powder, and vermiculite.

To prepare a durable structured catalyst, the resulting washcoat is deposited on a surface of a solid support. Suitable supports include silica, alumina, silica-alumina, carbon, titania, aluminum phosphate, Kieselguhr, cordierite (magnesium aluminum silicate), ceramics, and the like. The coating may be applied to the solid support by dipping (immersing) and removing the solid support from the washcoat, brushing the washcoat onto the support surface, or spraying the washcoat onto the support surface.

The washcoat deposited on the solid support is dried. This can be achieved by allowing the coated support to air dry. However, drying time can be shortened by utilizing heat and/or forced convection. The washcoat deposition and drying processes may be repeated to provide thicker coatings comprising a plurality of layers. As stated above, an advantage of the washcoats of this invention is that they exhibit both excellent adhesion with most substrate supports, and excellent cohesion between coating layers.

After a desired coating thickness has been achieved, the coated substrate may be calcined, i.e., heated to a temperature sufficiently high to substantially eliminate any volatile materials, but below a temperature at which the effective surface area of the coating is excessively reduced by sintering or other consolidation mechanisms.

After the coating has been dried, and optionally calcined, a metal catalyst is dispersed on the coating to complete the structured catalyst. A metal catalyst may be dispersed on the coating by impregnation or ion exchange. Examples of catalyst metals which may be used in the practice of this invention include copper, chromium, ruthenium, platinum palladium, rhenium and combinations thereof. The amount of metal used depends, among other things, upon reaction conditions and the particular metal or metal combination employed. For example, a suitable amount of ruthenium for use in catalytic hydrogenation is from about 0.01 to about 0.5 weight percent of the coated support. After impregnation and/or ion exchange, the metal impregnated, coated support may be dried, calcined and activated (e.g., reduced).

For metal catalyst impregnation or ion-exchange processing, the catalyst may be calcined and reduced in hydrogen. Generally, the dried catalyst is calcined by heating with flowing air or inert gas to a temperature of about 110° C. to about 600° C. or higher, preferably from about 350° C. to about 500° C. The time and temperature of the calcination should be sufficient to decompose metal salts, convert the metals to metal oxides and fix the metal oxides to the support. Any type of calciner, such as a rotary kiln, tunnel kiln, vertical calciner, etc. may be used.

The formed and calcined catalyst may be activated by reduction at an elevated temperature in the presence of a gaseous reductant such as hydrogen. For example, the calcined catalyst may be reduced with hydrogen at a temperature of about 75° C. to 500° C., more typically from about 400° C. to 500° C., and thereafter cooled to about 50° C., and stabilized by contacting the reduced catalyst with carbon dioxide.

The solid support of the invention could be fabricated in any suitable size or shape for use in slurry reactors or fluidized bed reactors. However, the preferred catalysts of this invention are structured catalysts for use in fixed bed reactors, with preferred shapes for those reactors being those having a honeycomb type structure wherein a fluid stream is capable of passing through open-ended cells or through-channels in the honeycomb structure. Other suitable shapes for the supported catalyst include extruded shapes, briquetted or tabletted cylinders, polylobal extrusions, spheres, rings, hollow core cylinders, or any other appropriate geometric shape. The solid support may be made by a variety of forming procedures, including extrusion, briquetting, tabletting, etc.

In one aspect, the supported catalyst of this invention may be utilized in a fixed bed reactor, i.e., a reactor in which the supported catalyst is located in a fixed position in a reactor, and a fluid stream passes through the reactor, and preferably through cells or channels defined in the supported catalyst.

In another aspect of the invention, a supported catalyst is contacted with an edible oil and hydrogen under hydrogenation conditions. Hydrogenation conditions generally involve a hydrogen pressure from about 100 to about 3000 psig, more typically from about 500 to 2000 psig. Hydrogenation conditions also employ a temperature from about 100° C. to about 300° C., more typically from about 150° C. to about 275° C., and even more typically from about 200° C. to about 250° C.

Hydrogenation of an edible oil according to the invention may be performed either in a batch or a continuous mode, with a continuous process being favored. Among the continuous modes, a fixed bed process using a structured catalyst is favored. For the fixed bed process, an edible oil in liquid form is passed through a fixed bed containing the supported catalyst in the presence of hydrogen at a pressure of from about 100 to 3000 psig and at a temperature from about 100° C. to about 300° C. The liquid hourly space velocity of the edible oil is controlled so as to effect optimum conversion of the fatty acid moieties having three carbon-carbon double bonds to fatty acid moieties having two carbon-carbon double bonds. Conditions may also be selected to minimize cis-trans isomerization.

In accordance with another aspect of this invention, a supported catalyst is prepared by oxidizing and catalyzing the surface of a shaped carbon support. The shaped carbon support may have generally any shape, with honeycomb shapes having cells or channels which allow a fluid stream to pass through being preferred. Methods of fabricating shaped carbon supports are known in the art. For example, U.S. Pat. No. 4,399,052 discloses direct extrusion of various structures including honeycomb-shaped structures from resins followed by carbonization and activation to make activated carbon structures.

The surface of the carbon support is subsequently oxidized to provide sites for ion exchange. Thereafter, ion exchange is utilized to introduce a catalyst precursor salt, such as tetraamine palladium II dichloride to these sites. The salt dissociates into cations that bind to the oxidized surface to provide a supported catalyst suitable for catalytic hydrogenation of edible oils. These supported catalysts may be used substantially in the same way that the supported metal catalysts prepared by depositing a washcoat containing a mixture of hydrolyzed silicon alkoxide and filler are used.

The following examples illustrate the supported catalysts of the present invention and their method of preparation. These examples are merely illustrative of the invention, and are not intended to limit the invention in any way.

EXAMPLES

Example 1

Tetraethyl orthosilicate (TEOS) is acid-hydrolyzed with hydrochloric acid and water to yield between 70% to 90% hydrolysis according to the following formula:

$$Si(OC_2H_5)_4 + 2XH_2O \rightarrow [Si(OC_2H_5)_{4(1-x)}(O)_{2x}] + 4XC_2H_5OH.$$

After the acidified water phase disappears, silicon dioxide is added in an amount that represents from about 50% to 70% by weight of the resulting slurry. The resulting alcohol slurry of silica and polymeric siloxyl and hydroxylated species have a viscosity sufficient for washcoating. A cordierite honeycomb solid support is dipped into the slurry and dried. The process is repeated to achieve a desired thickness. After the washcoated solid support is calcined, a catalyst is distributed on the coating using ion exchange technique.

FIG. 1 illustrates a comparison between the amount of palladium exchanged on silica gel powder as a function of ion exchange time with the amount of palladium exchange on a silica washcoat in accordance with the invention. FIG. 1 indicates that the amount of palladium that can be exchanged onto a silica washcoat in accordance with the invention is more than 150% higher than the amount exchanged onto silica gel powder in the same amount of time.

Figure 2:
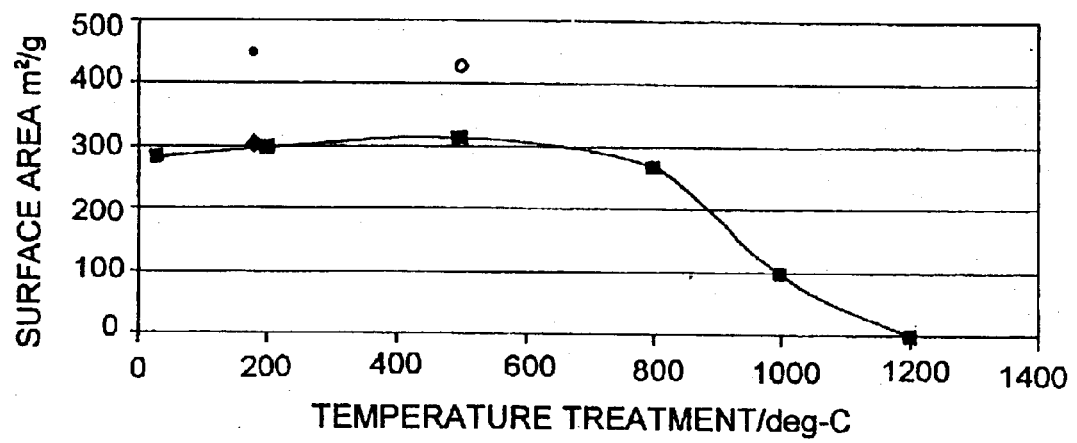
FIG. 2 is a graph showing BET surface area of silica washcoats, with and without exchanged palladium, as a function of temperature.

FIG. 2 illustrates the BET surface area of a silica washcoat, with and without exchanged palladium, as a function of temperature. FIG. 2 shows that the surface area of the silica washcoats of this invention is substantially higher than that of silica gel.

Example 2

Tetraethyl orthosilicate (TEOS) is combined with an aqueous slurry of either fused silica, silica gel, fumed silica, calcined or uncalcined silicic acid, and silica onto which a catalyst has been impregnated, and less than two volume percent hydrochloric acid, and mixed to initiate an in situ hydrolysis of the TEOS in the slurry. After a uniform consistency has been achieved in the slurry, honeycomb-shaped solid supports are coated with the slurry and dried. The process is repeated as necessary to increase the coating thickness as desired.

Example 3

The same procedure is followed as in Example 2, except that the silicon dioxide is ion exchanged with a catalyst salt before preparing it in a washcoat. Once the slurry is uniform, honeycomb-shaped solid supports are coated with the slurry and dried. The washcoats are then calcined and the catalyst is reduced.

Example 4

A preparation of high surface area γ-alumina is mixed with a sol-gel of a hydrolyzed aluminum alkoxide. After stirring and ball-milling the mixture for about 15 to 30 minutes, a cordierite honeycomb-shaped solid support is coated with the slurry, dried and calcined. The coated supports are impregnated with an anionic palladium or platinum precursor salt to a desired level, dried and calcined.

Example 5

Figure 3:
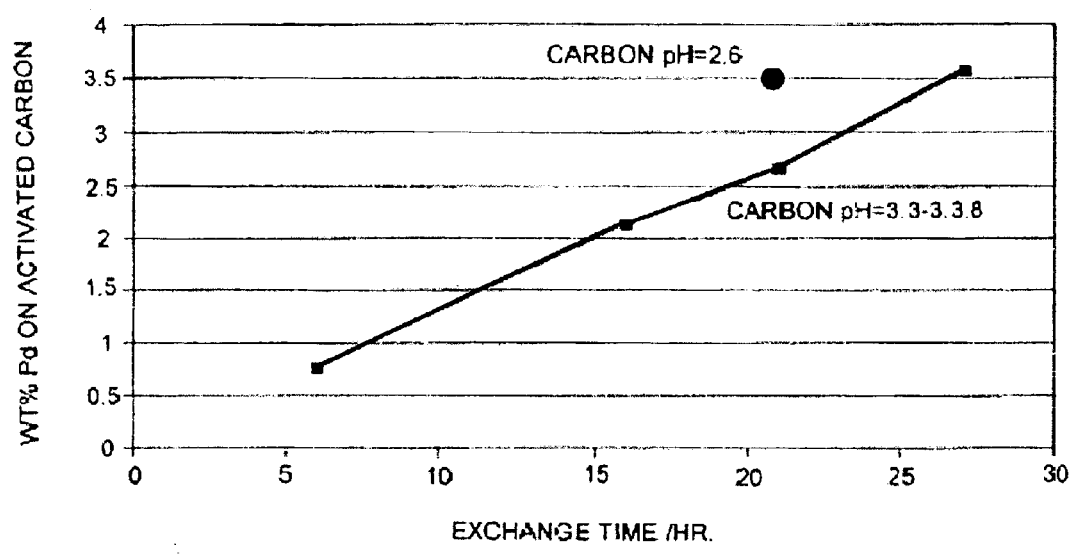
FIG. 3 is a graph showing the amount of palladium ion exchanged onto an extruded carbon support as a function of exchange time.

An extruded carbon honeycomb is immersed into an oxidizing bath to partially oxidize the carbon surface and yield ion exchange sites on its surface. A nitric acid solution is used for this purpose, 0.01 N–12 N concentrated solutions can be used, or higher if necessary. The honeycomb is left in the acid solution from 2–72 hr at 25–90° C., or higher if necessary, preferably 1–5 N concentration at 40–80° C. for 24–48 hr. The honeycomb is thoroughly washed in deionized water. The pH of the carbon decreases because of activation for pH~8–10 to a pH<4. This allows ion exchange of cationic catalyst precursor salts. The catalyst precursor salt, such as tetraamine palladium II dichloride, $(NH_3)_4PdCl_2$, dissociates into cationic Pd(II). For instance a 0.02–0.10M catalyst precursor solution is combined with ammonium hydroxide or some other pH-adjusting agent to raise the pH of the solution above 9. Chemically activated carbon honeycombs are immersed in the exchange solution, with optional stirring, for an amount of time to achieve a desired level of Pd loading. As shown in FIG. 3, the amount of Pd loading is dependent on both the exchange time and the surface pH of the activated carbon. Therefore, the carbon-supported catalyst is reduced.

It will become apparent to those skilled in the art that various modifications to the preferred embodiment of the invention as described herein can be made without departing from the spirit or scope of the invention as defined by the appended claims.

We claim:

1. A process of catalytically hydrogenating an edible oil, comprising:

contacting an edible oil and hydrogen, under hydrogenation conditions, with a structured catalyst having a durable surface layer selected from the group consisting of partially oxidized activated carbon and a washcoating containing the dried product of a hydrolyzed silicon alkoxide and a filler, and a metal catalyst selected from the group consisting of copper, chromium, ruthenium, platinum, palladium and rhenium distributed on the durable surface layer.

2. The process of claim 1 wherein the filler is selected from clays, zeolites, talc, carbonates, aluminosilicates, fly ash, silicates, titanates, zirconates, zirconia, zirconia spinel, magnesium aluminum silicates, mullite, alumina, alumina trihydrate, spinel, feldspar, attapulgites, cordierite powder, and vermiculite.

3. The process of claim 1 wherein the silicon alkoxide is tetraethyl orthosilicate and the filler is silica.

* * * * *